(12) United States Patent
Froeschl et al.

(10) Patent No.: US 6,871,250 B2
(45) Date of Patent: Mar. 22, 2005

(54) DATA BUS, PARTICULARLY IN MOTOR VEHICLES

(75) Inventors: Joachim Froeschl, Seefeld (DE); Michael Kaindl, Ergoldsbach (DE); Josef Krammer, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 36 days.

(21) Appl. No.: 10/431,597

(22) Filed: May 8, 2003

(65) Prior Publication Data

US 2004/0003153 A1 Jan. 1, 2004

Related U.S. Application Data

(63) Continuation of application No. PCT/EP01/10687, filed on Sep. 15, 2001.

(30) Foreign Application Priority Data

Nov. 8, 2000 (DE) .......................................... 100 55 163

(51) Int. Cl.[7] .............................................. G06F 13/00
(52) U.S. Cl. ....................................... 710/110; 710/105
(58) Field of Search ................................. 710/100, 104, 710/105, 110, 305, 313; 370/300; 340/423, 476

(56) References Cited

U.S. PATENT DOCUMENTS

| 5,159,691 | A | | 10/1992 | Fujita |
| 5,323,385 | A | * | 6/1994 | Jurewicz et al. ............. 370/300 |
| 5,469,150 | A | * | 11/1995 | Sitte .......................... 340/3.42 |
| 5,473,635 | A | | 12/1995 | Chevroulet |
| 5,954,796 | A | | 9/1999 | McCarty et al. |
| 5,958,029 | A | * | 9/1999 | McKinnon ................... 710/100 |
| 6,182,183 | B1 | * | 1/2001 | Wingard et al. ............ 710/305 |

FOREIGN PATENT DOCUMENTS

DE        690 33 152        10/1999

OTHER PUBLICATIONS

Introduction to LIN (Local Interconnect Network), Motorola, Mar. 2000.*
*Motorola Semiconductor Application Note* entitled Local Interconnect Network (LIN) Demonstration by Alan Devine, Mar. 31, 2000, pp. 1–68.

* cited by examiner

Primary Examiner—Khanh Dang
(74) Attorney, Agent, or Firm—Crowell & Moring LLP

(57) ABSTRACT

The invention relates to a data bus comprising slave nodes executing functions based on addressed command telegrams of an electronic main control unit which is also connected to said data bus. The command telegrams contain an identification field for addressing the commands whereby a reduced number of identification data is provided for said identification field. All functions which can be executed by the form of slave nodes on the data bus are respectively associated with at least one function number. Each slave node comprises a first non-volatile memory area, wherein the function numbers of the functions, which can be executed by a respective slave node are securely stored. Each slave node comprises a second programmable memory area, wherein identification information provided for the identification field can be stored associated with each function number stored by means of a special command telegram from the electronic main control unit to each function number stored in the first memory area.

17 Claims, 4 Drawing Sheets

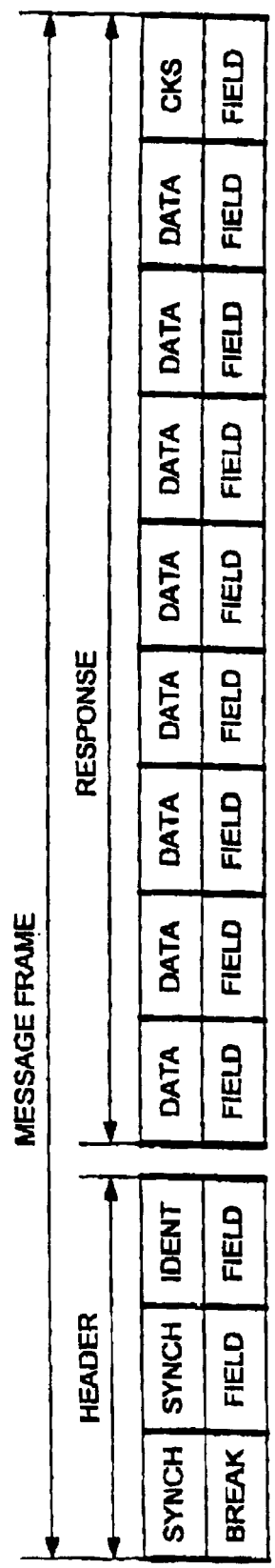

NNr:

DATA BUS, PARTICULARLY IN MOTOR VEHICLES

CROSS-REFERENCE TO RELATED APPLICATIONS

This application is a continuation of PCT Application No. PCT/EP01/10687 filed on Sep. 15, 2001.

BACKGROUND AND SUMMARY OF THE INVENTION

The invention relates to a data bus system, particularly a data bus system in motor vehicles and in automation technology, having slave nodes that execute functions based upon addressed command messages from an electronic main control unit that is also connected to the data bus, wherein the command messages contain an identifier field for addressing the commands, for which a limited amount of identifying information is provided.

A data bus of this type is known, for example, in the so-called LIN bus. The unique features of the LIN bus are described in the magazine article entitled "LIN Bus Cheap and Efficient", Elektronik Automotive, June 2000, pp 18 ff.

The LIN bus is a data bus for motor vehicles that is based upon the master-slave principle. The slave nodes (secondary control unit or controlled device) execute a multitude of simple logic functions based upon addressed command messages from the master (main control unit). For addressing purposes, a command message contains an identifier field (IDENT FIELD), for which only a limited number of identifying data are provided. At this time, only 64 pieces of identifying information, also called identifiers (LIN-ID) are available. The LIN bus is used for a multitude of different, simple functions within the vehicle, e.g. for switching lights on and off, for controlling the servomotors (for example for the window controls or the heating and air conditioning), for inputting sensor values (for example for the tire pressure monitoring system or temperature gauges). The number of possible functions far exceeds the number of identifiers, necessitating a data bus network with a multitude of partial buses.

According to the current definition of the LIN bus, LIN-ID's are permanently stored in a slave node. If a special LIN-ID is already permanently stored in a slave node, this will directly influence the LIN-ID's of the other slave nodes. The configuration of the LIN network must be known precisely beforehand to allow command messages to be assigned to LIN-ID's. This complicates the system engineering and makes the use of shared components nearly impossible. Altering a slave node often makes it necessary to alter all slaves in the network. Hereinafter, the term secondary control unit will be used to refer to slaves or slave nodes, differentiating from the main control unit (master).

The object of the invention is to improve upon a data bus of the type described at the beginning, with respect to the above-described disadvantages.

This object is attained by providing a data bus, particularly for motor vehicles and automation technology, with slave nodes that execute functions based upon addressed command messages from an electronic main control unit that is also connected to the data bus, wherein the command messages contain an identifier field for addressing the commands, for which a limited amount of identifying information is provided. Each function that can be executed by the slave nodes of the data bus is assigned at least one function number. Each slave node has a first, non-volatile memory area in which the function numbers of the functions that can be executed by the appropriate slave nodes are permanently stored, and each slave node has a second, programmable memory area, in which, for each of the function numbers stored in the first memory area, a piece of identifying information for the identifying field can be stored, as a result of a special command message from the electronic main control unit. Advantageous additional improvements on the invention are described herein.

According to the invention, all functions that can be executed by the slave nodes of the data bus are assigned at least one function number. A catalog of function numbers, which would be obligatory for the suppliers of the slave nodes and the main control unit, can be provided. A range of function numbers can be assigned to each supplier of slave nodes. Each slave node has a first, non-volatile memory area, in which the numbers of the functions that can be executed by the assigned slave nodes have already been permanently stored, e.g. in the supplier's factory. Each slave node has a second programmable memory area, in which, for each function number stored in the first memory area, a piece of identifying information (identifier, ID) provided for the identifying field can be stored, based upon a special command message from the electronic main control unit, especially during initialization of the completed data bus. The electronic main control unit may be an intelligent control device that is constantly connected to the data bus and/or a diagnostic device that can be intermittently connected to the data bus.

With the invention, a slave node contains no permanent control units or component addresses, in contrast to the current state of the art, in order to minimize the costs of managing the addresses. In accordance with the invention, the addressing of a function or a message is based primarily upon function rather than on components. For example, with the invention different slave nodes, which need not necessarily be structurally equivalent components but should at the same time be capable of executing the same function, should be assigned the same identifying data for executing this common function. In this way, identifying information in a concrete bus network can be eliminated. Because the message is always received first by all slave nodes, the addressed function is executed isochronously by the slave nodes.

The slave nodes preferably contain a coding device for generating a supplemental identification code on an as-needed basis, with which the slave nodes can be made distinguishable to the electronic main control unit in the special command message. This is particularly important when different identifying information for one and the same function number is to be stored in different slave nodes. With the identifying information, a definite identification of a slave node is possible for most applications, even without an identifying code. Nevertheless, this identifying code also serves to distinguish between identical components. The identifying code can be a small identifier (e.g. a maximum of 8 bits, sufficient for 256 identical components in a data bus) and should be as simple as possible to create. The coding device for creating the identifying code should be small and cost-effective. The identifying code should be variable and individually defined by the system designer, if the system network calls for this. It can be realized, e.g., by means of jumpers, zapping, or programming. A default value can be preset. The default value must be changed only if the identifying code is necessary. This identifying code does not represent a component address, but can act as a variable "component address", especially in conjunction with a function number.

For the identifier field of the special command message, a defined piece of identifying information is preferably provided, via which all slave nodes can be addressed, before the remaining identifying information assigned to the function numbers is stored.

Overall, with the invention, in the form of so-called "dynamic ID allocation", a flexible addressing of command messages is enabled.

Other objects, advantages and novel features of the present invention will become apparent from the following detailed description of the invention when considered in conjunction with the accompanying drawings.

BRIEF DESCRIPTION OF THE DRAWINGS

FIG. 1 is a rough outline of the command message in the LIN bus in accordance with the Protocol Specification;

FIG. 2 illustrates the construction of one possible special command message;

DETAILED DESCRIPTION OF THE DRAWINGS

Figure 3:
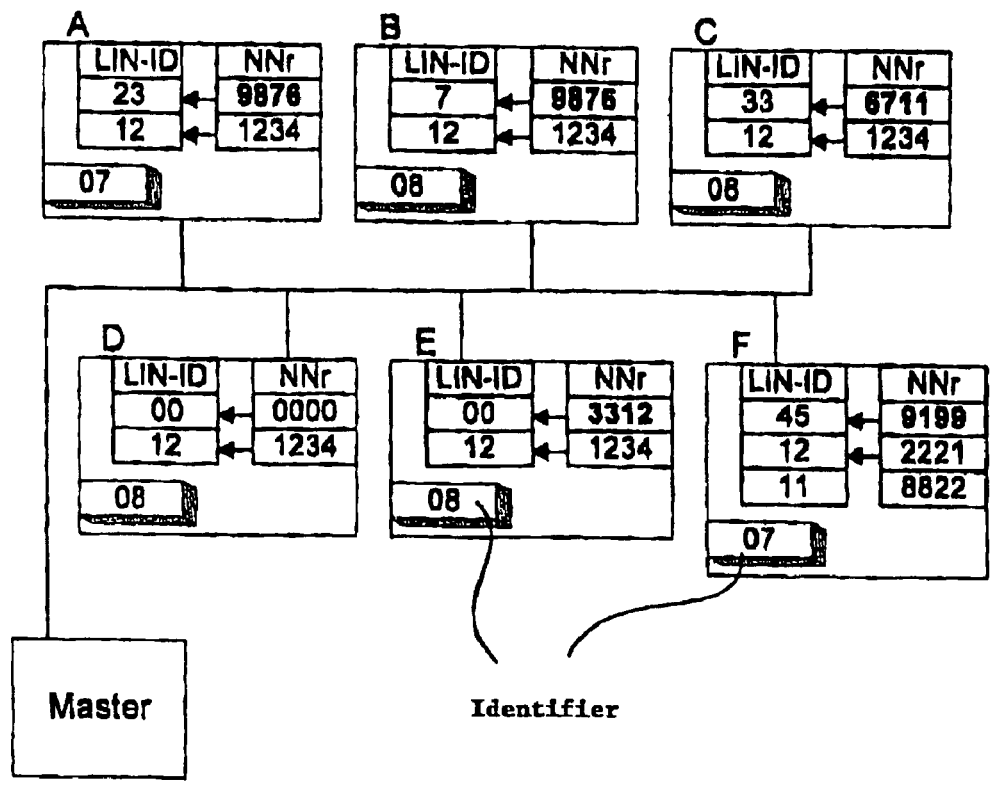
FIG. 3 is a data bus as specified in the invention based upon the dynamic storage of the identifying information in the slave nodes, and a schematic illustration of a simplified message sequence, which in this example is used for LIN-ID allocation.

In FIG. 1, the rough outline of the "normal" command message for executing a function following the allocation of the identifying information (hereinafter abbreviated to LIN-ID) is illustrated.

The command message (MESSAGE FRAME) is comprised of a header component (HEADER) and a data component (RESPONSE). The header component (HEADER) contains a starting field (e.g. 13 bits) (SYNCH BREAK), synchronization data (SYNCH FIELD), and the identifier field (IDENT FIELD). The identifier field (IDENT FIELD) contains only 1 byte (6 bits for the actual ID and two parity-check bits), wherein the number of LIN-ID's is limited to 64. The identifier field serves for addressing the commands. The data component ordinarily contains the command for executing a function in the form of several data fields (DATA FIELD). A message is closed with a checksum field (CKS field). (Corresponds to the current LIN specification "LIN Protocol Specification Revision 1.1" dated Apr. 17, 2000). The function may, for example, be switching on a light, adjusting a stepper motor, inputting a sensor value, or providing a diagnostic value.

FIG. 2 shows the construction of the special command message specifically for the function of the so-called dynamic LIN-ID allocation.

The entry 00111100 in the identifier field (IDENT FIELD) is one possible defined LIN-ID, via which all slave nodes can be addressed, before the dynamic LIN-ID allocation is carried out. The fields Dat 0 through Dat 7 correspond to the fields of the data component (RESPONSE) of the customary command message. The field Dat 0 conveys the type of slave nodes with which the main control unit wants to communicate. The content of DAT 0 could be 11111111, for example, if all stations in the data bus are to evaluate this message. Via the field Dat 0, for example, defined groups of slave nodes can also be addressed, in order to evaluate the subsequent data fields. The field Dat 1 conveys the type of function subsequently requested, in this case CMD for the dynamic LIN-ID allocation. This field Dat 1 is necessary only if additional functions are to be defined, which will affect all slave nodes or a certain group of slave nodes. In the fields Dat2 through Dat4, the function or message number NNr can follow. In the field Dat 5 follows the supplementary identification code (IDENTIFIER), if necessary. In Dat6 is the LIN-ID that, for the preceding message number NNr, should be stored in the slave nodes that contain this message number. The field Dat7 can be kept open for additional special features.

It is apparent from FIG. 2 that the special command message has the same LIN protocol as the customary command message. Hence, no change in protocol is necessary to realize the allocation of LIN-ID's during the initialization phase. This also serves to ensure compatibility with existing bus monitoring devices.

According to the invention, at least one function number (NNr) is already assigned as preparation, e.g. in the development phase of the data bus, in the form of a catalog of all functions that can be executed by the slave nodes of the data bus. In this, the maximum equipment is taken into account. The number of function numbers will far exceed the number of possible LIN-ID's, thus the function numbers NNr themselves cannot be used as LIN-ID, even if not all function numbers are needed in a data bus. Furthermore, the identifier field is too small to store the function number NNr there.

In FIG. 3, a data bus with an electronic main control unit MASTER and slave nodes A, B, C, D, E, and F is depicted. Each slave node A, B, C, D, E, F has a first, non-volatile memory area ROM (comp. also FIG. 4), in which the function numbers NNr of the functions that can be executed by the appropriate slave nodes are permanently stored. Each slave node A, B, C, D, E, F has a second, programmable memory area RAM (an EEPROM may also be used, for example). In the RAM, for each function number NNr that is stored in the first memory area ROM and is required for the data bus specially illustrated here, a piece of identifying information (LIN-ID) provided for the identifier field (IDENT FIELD) is stored (comp. also FIG. 4).

The slave nodes A, B, C, D, E, F contain a coding device, e.g. in the form of jumpers, for the manual creation of a supplementary identification code (IDENTIFIER). With this IDENTIFIER the slave nodes can be made distinguishable in the special command message, if for one function number, in this case e.g. NNr=9876, different identifying information, here for A: LIN-ID=23 [DEC] (based upon the 6 bit according to LIN Protocol Specification) and for B: LIN-ID=7 [DEC], is to be stored in different slave nodes, in this case e.g. A and B. However, this identification code IDENTIFIER does not correspond to any definite component or slave node address. In FIG. 3, e.g., the IDENTIFIER 08 has been allocated several times.

The slave nodes A, B, C, D, E, F can be very simple switching components, such as lamp switches, or small intelligent control devices, such as diagnostic servomotor controls. Nevertheless, the slave nodes A, B, C, D, E, F, are slaves in any case. For example, the main control unit (MASTER) is an individual intelligent control device, in which the LIN data bus is logically represented. For the main control unit (MASTER), the following data with respect to the slave nodes (slaves) is sufficient:

All functions (i.e. the messages that are necessary to execute the functions) that will be used with the associated LIN bus or LIN bus network (if more than one LIN data bus is connected to the master), If necessary, the identification code (IDENTIFIER) of the slave nodes, Also if necessary, the logic of the IDENTIFIER and the message number NNr.

It can be assumed that at least some slave nodes possess diagnostic capabilities. In this case, the main control unit (MASTER) must be capable of communicating with only one slave node. It should also be possible to carry out a data transfer from the main control unit to the slave nodes (secondary control units or slaves) and from slave nodes to the main control unit. This forces at least two messages that are at least familiar to each secondary control unit (even if the secondary control unit has no diagnostic capability, it must at least know that this type of message may not be evaluated by the secondary control unit). The LIN-ID's used for these messages are to be considered reserved (thus in the LIN-bus example two LIN-ID's are also allocated, which later may not be dynamically allocated, even by the master). One of these reserved LIN-ID's can also be defined as the LIN-ID that will be used to execute the dynamic LIN-ID allocation in the special command message. A slave node (LIN-slave) is in a position to process command messages based upon software. Hence, in the invention it is required of each slave node that a function or message number NNr exists for each of these command messages. In this case, slave nodes of similar construction also have the same software and function numbers NNr that must be permanently stored in the ROM of the slave node. For each function number NNr, there must be a corresponding 8-bit (1 byte) memory cell in the RAM, in which an LIN-ID assigned to one of these function numbers can be stored by the MASTER. The default value for this memory cell is, e.g., 00 [DEC].

In a slave node, more function numbers NNr can be filed than are later used in a concrete LIN bus or LIN bus network. Function number ranges can be selected by the LIN consortium. In this case, a slave node supplier or manufacturer can freely choose function numbers NNr from its range of numbers, without fear of overlapping with other manufacturers.

Figure 4:
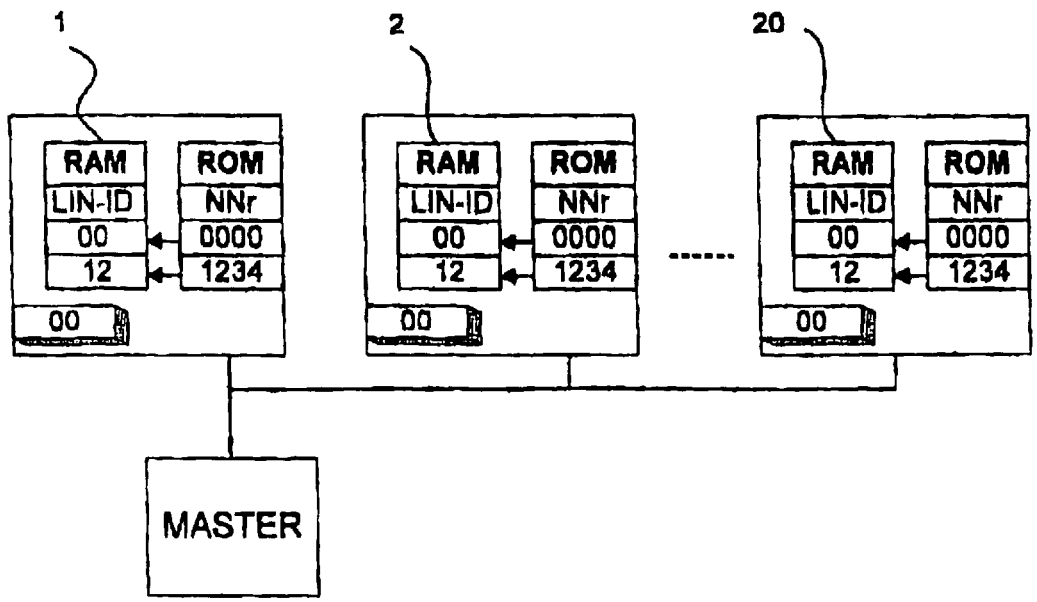
FIG. 4 is a simplified data bus that requires no additional identifying code.

In FIG. 4, a simplified example is depicted.

In an LIN bus having 20 lights as slave nodes, the dimming value is transmitted by the MASTER via precisely one command message. It is not necessary to distinguish between the slave nodes, since all perform the same function. In each slave node, only one function number NNr= 1234 allocated to this function is present, for which the LIN-ID 12 is stored. The IDENTIFIER is not necessary. The IDENTIFIER of all nodes is thus the same and can have the default value 00.

Figure 5:
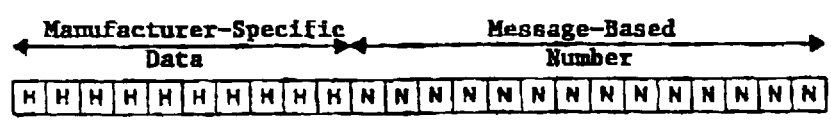
FIG. 5 illustrates a possible construction for the function numbers.

In FIG. 5, a possible construction of the function number NNr is shown.

To this end, a 3-byte-long number is provided. This number can be divided into two parts: The first 10 bits provide information on the slave manufacturer. These numbers are assigned to the slave manufacturer by the LIN consortium (ca. 1,000 manufacturers are possible). The numbers formed from the remaining 14 bits are assigned by the manufacturer to a message displayed in the slave.

The slave manufacturer will provide a data sheet on a slave, in which is described how the message (including the appropriate data length) is organized into an NNr (e.g. length information, position of the bits, etc . . . ).

Supplemental to the structure of the function or message number NNr:

The message number NNr can be constructed such that the following characteristic features of the slave node are recognizable:

Manufacturer-specific data,

Construction of the slave node, e.g. broken down into sensor, actuator, actuator and sensor, etc., NNr relates to message from master to slave or from slave to master, NNr is message for all.

If all the slave nodes of similar construction must be able to transmit identifiably with respect to the same function or function number NNr, and to identifiably receive, the logic of the IDENTIFIER of this slave node and the function number NNr must produce a "code", which in the data bus network is unambiguous and unique. It thus follows that the LIN-ID's allocated thereto are also unique in the bus network. This can also be used to unmistakably identify a secondary control unit or a slave node physically. This is particularly valuable for diagnostic purposes. In the LIN bus, for example, all messages from a slave to the master must be provided with an LIN-ID that is unique in the bus network. (Only one slave, according to LIN Protocol Specification, may transmit a message to the master at point in time x. If multiple slaves transmit simultaneously, the response in the LIN message is disrupted.)

Theoretically, the master can rearrange the LIN-ID's continuously and arbitrarily. This makes it possible to address more than 64 functions with command messages that conform to LIN. Although this "trick" requires more management expenditure in the main control unit (master), it has no effect on the slave nodes (LIN slaves). In place of independent buses or bus networks, each with its own main control unit, e.g. specifically designed partial-bus or partial-bus network operations can be created.

To this end, according to the invention, a piece of identifying information that is stored in a slave node for a function or function number (NNr) that is not required for a specific period of time, can advantageously be stored by the main control unit (MASTER) in any slave node of the same bus or bus network, at least for this specific period of time, for another function or function number that, e.g., is necessary for this specific period of time. That is, a piece of identifying information (LIN-ID) that is stored for at least a predetermined first period of time for a function or function number in a slave node, is stored by the main control unit for at least a predetermined second period of time that is beyond the predetermined first period of time, for another function or function number, in any (the same or another) slave node.

With this "intelligent software" in the main control unit, the disadvantage of the small amount of identifying information can be improved.

Figure 6:
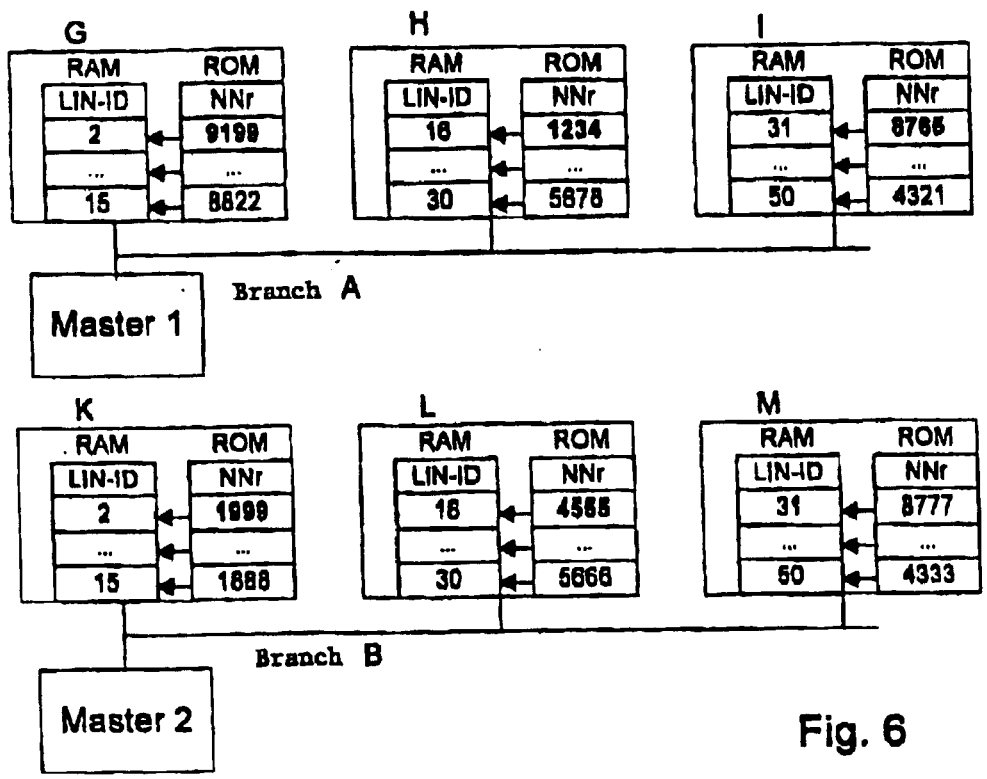
FIG. 6 shows two independent LIN buses with dynamic LIN-ID allocation.
Figure 7:
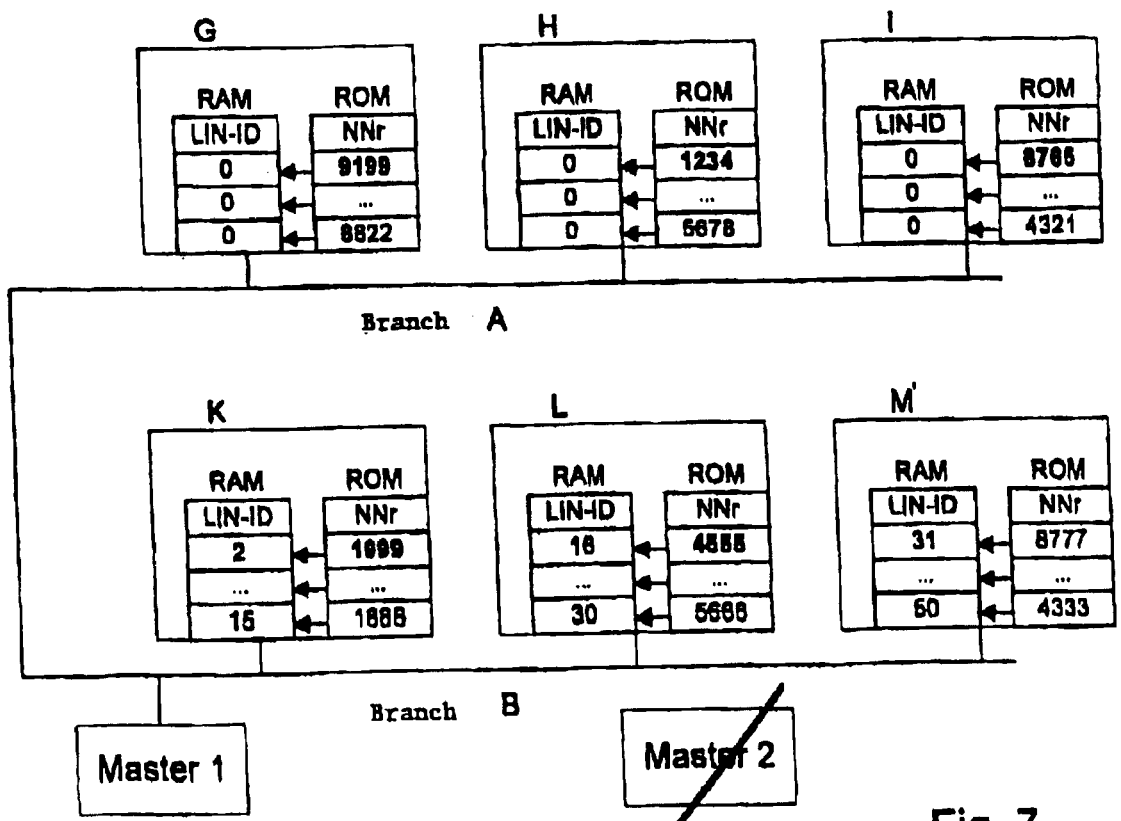
FIG. 7 illustrates an integrated, single LIN-bus network in accordance with FIG. 6, in which a rearrangement of the LIN-ID's has taken place.

This additional improvement as specified in the invention is described in greater detail in the example of the LIN bus network, with reference to FIGS. 6 and 7.

(For purposes of simplification, the identifying code (IDENTIFIER) in the nodes is not depicted in FIGS. 6 and 7. In these examples, the identifying code (IDENTIFIER) has no meaning, since the function numbers (NNr) are already unambiguous.)

In FIG. 6, two functionally different LIN bus systems are shown, independent of one another. A first LIN bus system is comprised of the master 1 and the slave nodes G, H, and I (Branch A). The second LIN bus system is comprised of the master 2 and the slave nodes K, L and M (Branch B). In each LIN bus system, e.g., 50 (of a possible 64) pieces of identifying information in the form of LIN-ID's (also called message identifiers) are used. FIG. 6 shows the LIN bus systems after the dynamic allocation of identifying information (LIN-ID's) has taken place (process as described in relation to FIG. 3, for example). The branches A and B each use the LIN-ID's 2, 15, 16, 30, 31, and 50, for different function numbers NNr.

In FIG. 7, the two LIN bus systems in FIG. 6 are combined. Here, the single master 1 (master 2 is no longer necessary)—specifically at a predetermined first time—allocates the LIN-ID 0 to all message numbers NNr of the Branch A. In the Branch B, the LIN-ID's are distributed in correspondence with the second LIN bus system in FIG. 6. Because the main control device (master 1) can dynamically and arbitrarily allocate LIN-ID's, the allocation of the LIN-ID 0—at a predetermined second time—can also take place for all function numbers NNr in the Branch B. The rearrangement of the identifying information, in this case LIN-ID's, can be carried out as often as desired during the operating time of the overall system.

Advantages of the above-described process:
Quasi-expansion of the identifying information space, and
The number of (physical) master control devices can be minimized.

Possible Application and Use

In automobile design, for example, the air conditioning system and the engine-independent heating system can be controlled by a single main control unit. The LIN bus would also be well suited for this. The engine-independent heating system is used when the vehicle is secured and standing still (predetermined first time); the air-conditioning system, only while the engine is running (predetermined second time). Both systems are logically separable from one another. Thus, both function units could be controlled by one main control unit (master), according to the above model. It should also be pointed out that the invention is not limited to the LIN bus, although it is particularly advantageous for use with the LIN bus.

For example, the process can also be transferred to other data bus systems, such as the CAN bus (Multi-Master Bus System). In a CAN bus system, one (or more) CAN control device is possible, which (for a short period of time) as the main control unit assumes control of the CAN identifying information, and dynamically allocates this information. (At this time, the other CAN control devices become secondary control units.) It is also possible that this could be carried out by several CAN control devices, which would alternately become the main control unit in the CAN network for short periods of time, with each assuming responsibility for a range of function numbers NNr. In the case of the CAN, no change in protocol is necessary for the special command message, as more data fields are available for use.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A data bus system for use in motor vehicles and automation technology, comprising:
    a data bus;
    an electronic main control unit coupled to the data bus;
    slave nodes coupled to the data bus, the slave nodes executing functions based upon addressed command messages from the electronic main control unit, wherein the command messages contain an identifier field for addressing the commands and for which a limited amount of identifying information is provided;
    wherein each function executable by the slave nodes of the data bus is assigned at least one function number, each slave node having a first, non-volatile memory area in which the function numbers of the functions executable by appropriate slave nodes are permanently stored; and
    wherein each slave node has a second, programmable memory area, in which, for each of the function numbers stored in the first memory area, a piece of identifying information for the identifying field is storable, as a result of a special command message from the electronic main control unit.

2. Data bus system according to claim 1, wherein the slave nodes contain a coding device for creating an additional identifying code, via which the slave nodes in the special command message from the electronic main control unit can be made distinguishable when necessary.

3. Data bus system according to claim 1, wherein for the identifier field of the special command message, a definite piece of identifying information is provided, via which all slave nodes can be addressed.

4. Data bus system according to claim 2, wherein for the identifier field of the special command message, a definite piece of identifying information is provided, via which all slave nodes can be addressed.

5. Data bus system according to claim 3, wherein after the identifying field in the special command message, at least the function number and the identifying information allocated to it follow.

6. Data bus system according to claim 4, wherein after the identifying field in the special command message, at least the function number and the identifying information allocated to it follow.

7. Data bus system according to claim 3, wherein after the identifying field in the special command message, at least the function number and the identifying information assigned to the combination of function number and identifying code follow.

8. Data bus system according to claim 4, wherein after the identifying field in the special command message, at least the function number and the identifying information assigned to the combination of function number and identifying code follow.

9. Data bus system according to claim 1, wherein a piece of identifying information that is stored for at least a predetermined first time for a function or function number in a slave node, is stored by the main control unit for at least a predetermined second time beyond the predetermined first time, for another function or function number in any slave node.

10. Data bus system according to claim 2, wherein a piece of identifying information that is stored for at least a predetermined first time for a function or function number in a slave node, is stored by the main control unit for at least a predetermined second time beyond the predetermined first time, for another function or function number in any slave node.

11. Data bus system according to claim 3, wherein a piece of identifying information that is stored for at least a predetermined first time for a function or function number in a slave node, is stored by the main control unit for at least a predetermined second time beyond the predetermined first time, for another function or function number in any slave node.

12. Data bus system according to claim 5, wherein a piece of identifying information that is stored for at least a predetermined first time for a function or function number in a slave node, is stored by the main control unit for at least a predetermined second time beyond the predetermined first time, for another function or function number in any slave node.

13. Data bus system according to claim 7, wherein a piece of identifying information that is stored for at least a predetermined first time for a function or function number in a slave node, is stored by the main control unit for at least a predetermined second time beyond the predetermined first time, for another function or function number in any slave node.

14. A slave node for a data bus system for use in motor vehicles and automation technology wherein slave nodes execute functions based upon addressed command messages from an electronic main control unit that is coupled to a data bus and wherein the command messages contain an identifier field for addressing the commands, a limited amount of identifying information being provided for the identifier field, comprising:
   a first, non-volatile memory area in which function numbers of functions executable by the slave node are permanently stored;
   a second, programmable memory area in which, for each function number stored in the first memory area, a piece of identifying information provided for the identifier field is storable via a special command message received from the main control unit.

15. The slave node according to claim 14, further comprising a coding device to enable an additional identification code to be flexibly created.

16. An electronic main control unit for a data bus system for use in motor vehicles and automation technology wherein slave nodes coupled to the data bus execute functions based upon addressed command messages from the electronic main control unit coupled to the data bus, said command messages containing an identifier field for addressing the commands and for which a limited amount of identifying information is provided, each function executable by the slave nodes of the data bus being assigned at least one function number, the electronic main control unit comprising:
   means for creating a special command message by which a piece of identifying information for the identifier field is storable in a slave node for each function number stored therein.

17. A method of using a data bus for a motor vehicle having slave nodes that execute functions based upon addressed command messages from an electronic main control unit that is also connected to the data bus, wherein the command messages contain an identifier field for addressing the commands for which a limited amount of identifying information is provided, the method comprising the acts of:
   for each function executable by slave nodes of the data bus, assigning at least one function number permanently storable in the slave nodes; and
   as a result of a special command message from the electronic main control unit, for each of the function numbers permanently stored in the slave nodes, programming identifying information allocated to the function numbers that can be stored in the slave nodes.

* * * * *